UNITED STATES PATENT OFFICE.

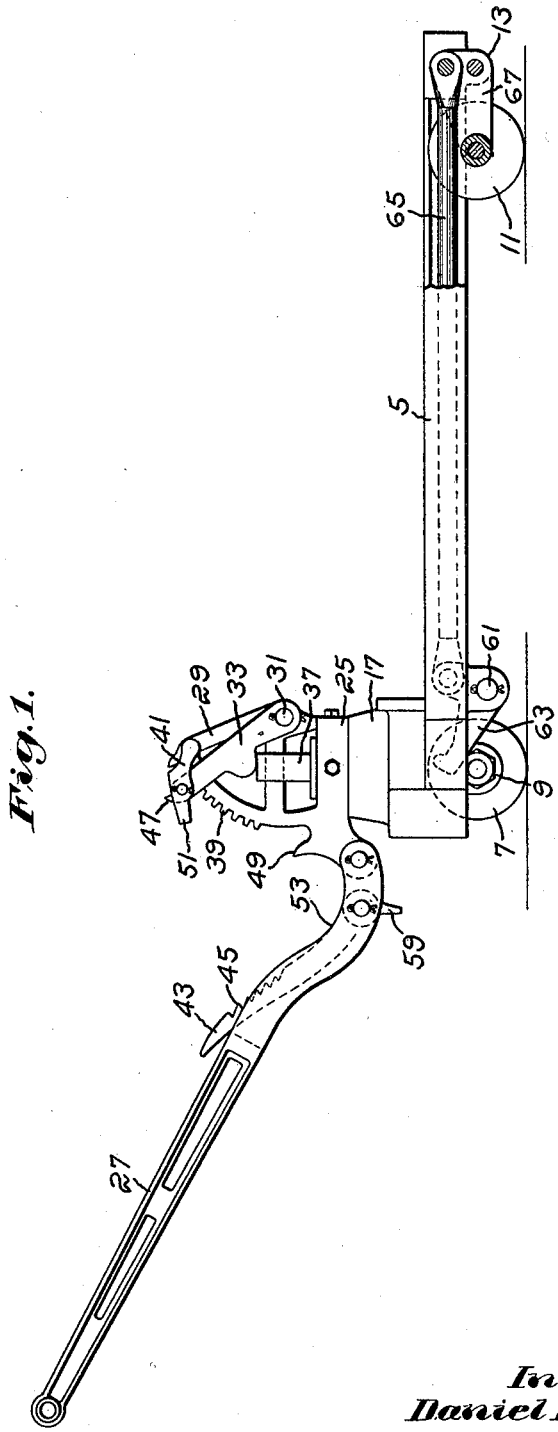

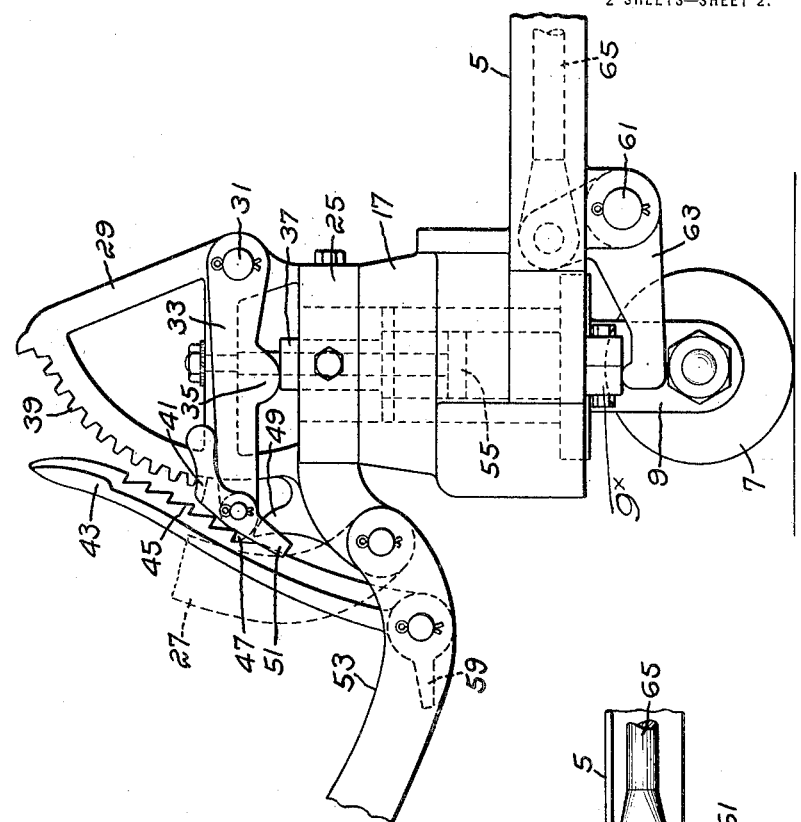
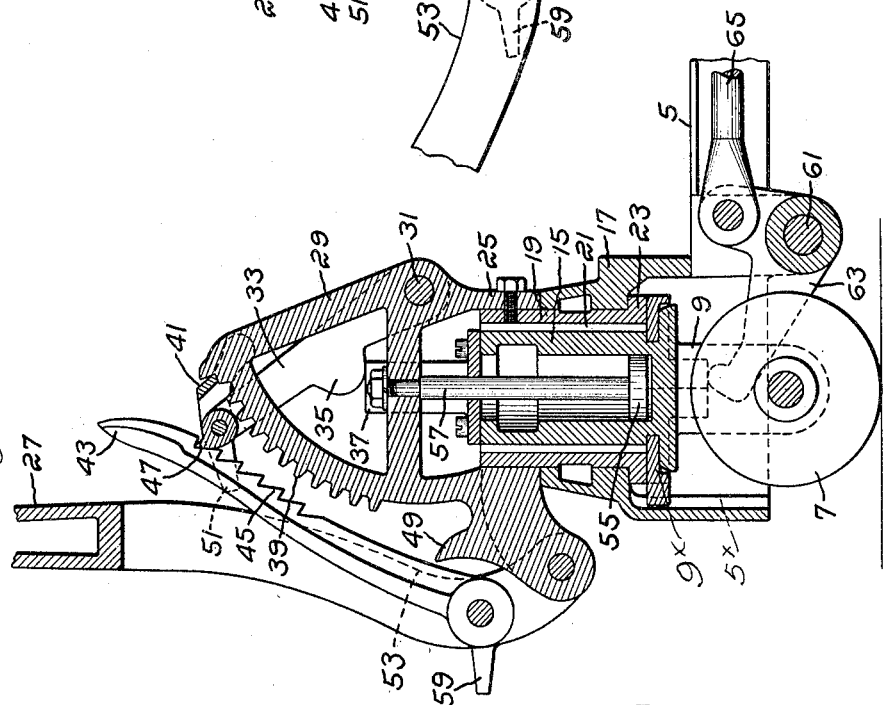

DANIEL E. HENNESSY, OF CUDAHY, WISCONSIN, ASSIGNOR TO THE STURDI-TRUCK COMPANY, OF NORTHAMPTON, MASSACHUSETTS, A CORPORATION OF MASSACHUSETTS.

ELEVATING-TRUCK.

1,376,809.  Specification of Letters Patent.  Patented May 3, 1921.

Application filed December 27, 1919, Serial No. 347,705. Renewed October 1, 1920. Serial No. 414,140.

*To all whom it may concern:*

Be it known that I, DANIEL E. HENNESSY, a citizen of the United States, and a resident of Cudahy and State of Wisconsin, have invented an Improvement in Elevating-Trucks, of which the following description, in connection with the accompanying drawings, is a specification, like characters on the drawings representing like parts.

This invention relates to elevating trucks of the type having a movable platform which may be raised and lowered relatively to the running gear. The present improvements more particularly relate to improved means for elevating the load-carrying platform.

My invention will best be understood by reference to the following description of the illustrative embodiment thereof shown as an example in the accompanying drawings wherein:

Figure 1 is a side elevation of the truck with the platform in lowermost position;

Fig. 2 is a central vertical section of the forward end of the truck on an enlarged scale; and Fig. 3 is a side elevation of the parts shown in Fig. 2, but with the platform in elevated position.

Referring to the drawings, the truck here shown comprises the vertically movable, load-receiving platform or elevating frame 5 which may conveniently be of a skeletonized rectangular form and which is supported on front and rear wheeled supports. I have here (see Fig. 2) shown a single, centrally positioned front wheel 7 journaled in a fork 9 and (see Fig. 1) a pair of rear wheels 11 journaled on an axle tree 13 eccentrically connected to the platform 5. Herein means are provided for vertically lifting the platform with respect to the forward wheel 7 and transmission means for concomitantly raising the rear end of the platform relative to its wheels. The mechanism here disclosed for lifting the rear end of the platform at the same time as the forward end I have disclosed elsewhere and it forms in itself no part of the invention claimed in the present application. I therefore consider it unnecessary to describe it in detail in this place.

The present application has more particularly to do with the mechanism for lifting the forward end of the truck relatively to the supporting wheel 7, and the preferred embodiment of the invention may be clearly understood from reference to Fig. 2. I have there shown the fork 9 as provided with a vertically extending male swivel bearing 15 (preferably in the form of a hollow cylinder for a purpose hereinafter to be described), which bearing member 15 is received by, and is adapted to turn in and move vertically relatively to, a steering head or sleeve-like support 17 rising from the forward end of the platform. The parts 15 and 17 may be connected by an intermediate member 19 arranged to turn with the bearing member 15 but to move vertically relatively thereto, and to turn relatively to the steering head 17 but to move therewith in a vertical direction. The intermediate member 19 herein shown is in the form of a sleeve connected to the male swivel member 15 by keys 21, but being freely slidable thereon and engaged with the steering head 17 of the platform to lift therewith by the flange 23 projecting from its lowermost portion between which and the removable collar 25 the steering head 17 is clenched. To the collar 25 is pivoted a draft tongue or handle 27 by which the truck is drawn about. It will be understood that the truck may be steered by suitably swinging the draft tongue 27, the collar 25 turning with it the intermediate sleeve 19 which also turns the fork-carrying bearing 15 and consequently the forward steering wheel 7, this guiding action of the forward wheel being independent of any movement of the supporting platform 5. Similarly, the platform with its steering head 17 may be raised bodily relative to the wheel, carrying with it the intermediate member 19 which slides freely on the male swivel bearing 15. The steering control of the wheel 7 through the draft tongue 27 is in no way interrupted by such lifting action.

I will next describe the particular means herein disclosed for lifting the platform relatively to the forward wheeled support. In the present example the traction tongue 27 also serves as an operating lever whereby the platform may be lifted, the lever being given a suitable oscillating or pumping action which lifts the platform, conveniently by a pawl and ratchet mechanism or other similar self-sustaining means. Herein the collar 25 has built up therefrom a suitable frame 29 providing a pivot 31 for a forked lever 33 embracing the frame 29, the arms of which lever have intermediate rounded bearing portions 35 adapted to coöperate with upwardly directed extensions 37 from the upper end of the member 15. It will be understood that if the lever 33 is swung in a counterclockwise direction viewing Fig. 2, the intermediate portion is supported by the wheel 7 and provides a fulcrum about which the pivot 31 is lifted, and the forward end of the truck is thus elevated. Herein a part of the frame 29 forms a sector rack 39 with which coöperates the retaining pawl 41 pivoted on the free end of the lever 33, the pawl being suitably weighted so that it may normally interlock with the rack.

In the present instance a multiple lever system is provided for raising the forward end of the truck, giving a large mechanical advantage to the operator, the draft tongue 27 herein serving as one lever and acting to operate the secondary lever 33 already described. To permit this action, I have herein shown a rack bar 43 provided with suitable ratchet teeth 45 pivoted to the draft tongue 27 adjacent its point of connection to the sleeve 25, the teeth 45 being adapted to engage a tooth 47 at the terminal end of the lever 33.

The operation of the lifting mechanism may now be clearly understood. Supposing the parts to be in the position shown in Fig. 1, the draft tongue 27 may be swung clockwise toward the position of Fig. 2, and this will permit the rack bar 43 to drop into engagement with the tooth 47 as shown in Fig. 2. The tongue 27 may now be operated by one or more downward strokes and the rack bar 43 will rock lever 33 around its pivot toward the position of Fig. 3, thus lifting the platform 5. At any intermediate position the pawl 41 will engage with the segment rack 39 and hold the platform in an elevated position and will permit the lifting of the draft tongue 27 upwardly for another downward stroke. In the lowermost position of the lever 33, as shown in Fig. 3, the outer end thereof may be supported by the projection 49 carried as a part of the collar 25. In this position the lever 33, in its turn, will support through the rack bar 43 the draft tongue 27 in a substantially horizontal position where it may readily be grasped and will not permit it to fall to the ground. It is of course possible to lift the draft tongue 27 to a more nearly upright position without disturbing the frame which is locked by the pawl 41 in the elevated position shown in Fig. 3.

In the present embodiment of the invention means are provided whereby the movement of the draft tongue or handle 27 to an extreme position may serve to release the truck to permit it to descend from its elevated position to its lowermost position; and herein the pawl 41 is provided with forwardly projecting arms 51 adapted to make contact with the inner surfaces 53 near the pivot of the draft tongue, which surfaces are conveniently curved to follow the arc of the segment 39. If it is desired to release the truck from the position shown in Fig. 3 to permit the platform to descend, the tongue 27 may be swung to its uppermost position somewhat beyond the dotted line position in Fig. 3. As indicated in that figure, the curved parts 53 of the tongue will make contact with the projecting portions 51 of the pawl and as the tongue moves to extreme position, just beyond that shown in dotted lines, the pawl will be thrown out of engagement with the segment 39, releasing the platform and permitting it to settle downwardly. The projections 51 will ride along the curved portions 53 of the tongue which thus serve to keep the pawl out of engagement with the rack until the platform has fully descended. In this action the projection 49 will make contact with rack bar 43 and effectually prevent the teeth 45 thereof from engaging with tooth 47 on lever 33 during the descent of the platform.

Preferably means are provided for cushioning the descent of the platform and herein the male swivel member 15 is in the form of a cylinder which may serve as a portion of a suitable dashpot or like fluid check, being adapted to coöperate with piston 55 having a piston rod 57 attached to and moving with the framework 29. The piston thus moves with the platform while the coöperating cylinder is carried by the wheeled support and the parts may thus function as a dashpot in the descent of the former relative to the latter, as will be well understood from Figs. 3 and 2.

I have herein shown the rack bar 43 as provided with a projection 59 which is presented at the forward end of the draft tongue, as shown in Fig. 2, convenient for operation by the foot of the user. If the parts are in the position shown in Fig. 2, this projection serves as a convenient means for releasing the rack bar 43 from engagement with the tooth 47 on lever 33, permitting the draft tongue to be lowered toward the position of Fig. 1, so that the truck may be drawn about without prior elevation of the platform. When the truck is not in use and the platform is in its lowermost position, the draft tongue 27 is sustained in elevated position by the engagement of the rack bar with the lever 33, as shown in Fig. 2.

As the frame 5 is lifted from the position shown in Fig. 2, the pivot 61 of the bell crank lever there shown will be lifted, causing the arms 63, which are engaged with the under side of a non-rotatable collar 9ˣ vertically fixed on the fork support 9 to swing in a counterclockwise direction and through the other arm of the bell crank to draw toward the left the reach rod 65. The rod 65 will, through the bell crank arms 67, rock the eccentrically mounted axle tree 13, depressing the wheels 11, or rather, lifting the rear end of the platform relatively to those wheels. The collar, while vertically fixed on the forked support, is rotatably movable thereon and non-rotatably related to the steering head 17 and lifting platform 5 by sliding engagement with a grooved portion 5ˣ in the front of the head. By this means the rear end of the platform is, in the form of the invention illustrated, caused to lift concomitantly with the front end. It may be noted that in the mechanism here shown the reach rod 65 will lift with the platform 5 and that in the elevated position of the latter there will be no obstruction beneath the lower part of the platform between the front and rear wheels. This is of considerable advantage as it permits the truck to be operated over surfaces abruptly changing in direction without its catching between the wheels.

I have described in detail the form of my invention illustrated in the accompanying drawings, my purpose in so doing being descriptive rather than definitive. The principles exemplified by the particular mechanism shown and thus completely described, I shall define in the following claims.

1. An elevating truck comprising an elevating frame, a wheeled support, an intermediate member which lifts with the platform and turns with the support, a segment rack thereon, a lever engaging the support also on said member, a pawl on the lever coöperating with the rack and a second lever pivoted on said member and having a rack pivoted thereon adapted to engage the lever.

2. A truck as defined in claim 1 wherein the pawl has a part in the path of said second lever and may be thrown thereby.

3. An elevating truck comprising an elevating frame, a wheeled support, an intermediate member which lifts with the platform and turns with the support, a segment rack thereon, a lever engaging the support also on said member, a pawl on the lever coöperating with the rack, a draft tongue pivoted on said member and having a rack pivoted thereto to engage and operate the lever and a stop for said lever.

4. An elevating truck comprising an elevating frame, a wheeled support, and an intermediate member vertically fixed but rotatably movable with respect to the frame and rotatably fixed but vertically movable with respect to the support and including a segment and a lever engaging the support and positionable by said segment.

5. An elevating truck comprising an elevating frame, a wheeled support, an intermediate member vertically fixed but rotatably movable with respect to the frame and rotatably fixed but vertically movable with respect to the support and including a segment and a lever engaging the support and positionable by said segment, and a draft tongue pivoted on said member and having releasable means for operating said lever.

6. An elevating truck comprising an elevating frame, a wheeled support having swiveling connection therewith, means for vertically moving the frame relatively to the support comprising a lever and a positioning pawl therefor and a draft tongue swiveling with said support, said tongue in one position adapted to throw the pawl to release the parts.

7. An elevating truck comprising an elevating platform and running gear, a draft tongue for the platform and self-sustaining lifting mechanism operated by oscillation of said tongue for lifting the platform relatively to the running gear, movement of said tongue to an extreme position operating to release said mechanism to drop the platform.

8. An elevating truck comprising an elevating platform and running gear, a lever for lifting the platform relatively to the running gear, a pawl on said lever, a rack for positioning the pawl, a second lever having means for gripping the first lever to operate the same, said second lever also having a part for engaging said pawl to throw it from engagement with the rack.

9. An elevating truck comprising an elevating platform and running gear including a swiveled forward wheeled support, a pivoted draft tongue adapted to turn said support on its swivel, elevating mechanism for the platform including a movable lifting member and a sustaining locking member carried by the lifting member and having a part in the path of the draft tongue whereby the elevating mechanism may be unlocked by movement of the tongue.

10. An elevating truck comprising an elevating platform and running gear, self-sustaining elevating means for lifting the platform including a toothed member, an operating lever having a toothed bar pivoted thereto adapted to drop by gravity into engagement with said member and in such engagement sustaining the lever, said bar having an extension providing an operating portion for releasing such engagement.

11. An elevating truck having an elevating frame 5, a wheeled support 15 swiveled therein, an intermediate member 19 adapted to turn with the support and lift with the frame, a combined elevating and steering tongue 27 pivoted on the intermediate member to swing vertically, a member 43 pivoted on the tongue, and a lifting lever 33 having unequal arms and working about a vertically fixed fulcrum point 37 intermediate at its ends on the wheeled support, said lever having the end of its shorter arm operatively connected to the intermediate member and its longer arm engageable by the member pivoted on the tongue, whereby it may be depressed, through movement of the tongue, without bodily movement of its fulcrum point, and the intermediate member and frame thereby lifted.

12. An elevating truck having an elevating frame, a wheeled support, steering mechanism including a tongue mounted to swing vertically, a lifting lever working about a fulcrum point which is vertically fixed upon said wheeled support and having operative connection at one end to the frame to lift the latter with relation to the wheeled support and a member pivoted on the tongue to engage the opposite end of the lever to depress the latter and raise the frame.

13. In an elevating truck, the combination with an elevating frame of a wheeled support adapted to turn about an upright axis in said frame, and lifting means to lift the frame on the support including a pivoted lifting and steering tongue, a pivoted lifting lever, and an actuator pivoted on said tongue and engageable with said lifting lever to elevate said frame.

14. In an elevating truck, the combination with an elevating frame of a wheeled support swiveled about an upright axis in said frame and lifting means to lift the frame on the support including a pivoted lifting and steering tongue mounted to swing vertically, a lifting lever fulcrumed at a different point from said tongue and operative connections between the lever and the tongue.

15. In an elevating truck, the combination with an elevating frame of a wheeled support adapted to turn about an upright axis in said frame and lifting means to lift the frame on the support including a pivoted lifting tongue, a lifting lever and step-by-step mechanism to move said lever by said tongue.

16. In an elevating truck the combination with an elevating frame of a wheeled support adapted to turn about an upright axis in said frame, and lifting means to lift the frame on said support including a lifting tongue, a lifting lever, step-by-step actuating means to move the lever through the tongue, said lifting means being adapted to turn with said wheeled support.

17. An elevating truck having load-supporting means, a wheeled support adapted to turn about an upright axis with relation thereto, steering mechanism including a tongue pivotally mounted to swing vertically, a lifting lever working about a fulcrum point vertically fixed with relation to the load-supporting means and adapted to turn with the wheeled support relatively to the load-supporting means and an operative connection between the tongue and lifting lever.

18. An elevating truck comprising an elevating frame, a wheeled support adapted to turn about an upright axis to steer the truck, means for lifting the frame relatively to the support comprising a pivoted draft tongue, a lifting lever operatively related at one point to the frame and at another to the wheeled support, and toothed engaging members for operatively connecting the tongue to the lifting lever, said tongue, lever and toothed engaging members being mounted to turn with said wheeled support.

19. An elevating truck comprising an elevating frame, a wheeled support adapted to turn about an upright axis to steer the truck, a structure adapted to turn with the wheeled support and lift with the frame and lifting means comprising a draft tongue pivoted on said structure, a lifting lever fulcrumed on the wheeled support but operatively connected to the said structure, and operative connections between the lever and tongue to move the former step by step.

20. An elevating truck having a lifting frame, a wheeled support adapted to turn about an upright axis to steer the truck, a combined steering and lifting tongue mounted to swing vertically, a lifting lever with means for actuating the same step-by-step from the tongue, and a liquid check coaxial with the steering axis to check the descent of the frame.

21. An elevating truck having wheeled supports at the opposite ends thereof, a main frame constituting both an elevating platform for the load and a connecting frame for the wheeled supports, a steering head in which the front wheeled support has a turning movement for steering the truck, the frame being capable of lifting movement with relation to said wheeled support, means for lifting the front end of the frame with relation to said wheeled support and comprising a lifting lever working about a fixed fulcrum point on the wheeled support and having operative connection to the elevating frame, a pivoted draft tongue connected to turn with the wheeled support and mounted to swing vertically to lift the frame and step-by-step actuating connections between the pivoted lifting tongue and the lifting lever to elevate the frame step by step, a movable connection between the rear wheeled support and the lifting frame movement of which serves to elevate the rear end of the frame, a second lifting member for the rear end of the truck also working about a vertically fixed fulcrum point on the front wheeled support and operatively related to the lifting frame to be moved thereby as the frame is lifted relatively to the front wheeled support, and operative connections between said second lifting member and said movable connection to move the latter and lift the rear end of the frame when the front end of the frame is elevated.

22. An elevating truck having a load support, a wheeled support adapted to turn about an upright axis with relation to the load support for steering the truck, a lifting lever fulcrumed intermediate its ends at a vertically fixed point upon the wheeled support and adapted to turn therewith about its upright axis, one end of the lever being operatively connected directly to the load support, a combined lifting and steering tongue mounted to swing vertically and to turn with the wheeled support, and a pivoted rack bar carried by the tongue and engageable step-by-step directly with the opposite end of the lifting lever whereby the lifting lever can turn with the wheeled support in steering and in any steering position may be engaged by the rack bar out of the line and direction of the steering axis to lift the load support on the wheeled support and whereby the load support may be lifted by the rack bar directly through the lifting lever without bodily upward movement of the latter.

In testimony whereof, I have signed my name to this specification.

DANIEL E. HENNESSY.